United States Patent [19]
Heiner et al.

[11] Patent Number: 5,465,559
[45] Date of Patent: Nov. 14, 1995

[54] HAY ROLL BAGGING SYSTEM

[76] Inventors: Hal R. Heiner, 5550 Tincup Junc. Rd.;
Kendall Jenkins, P.O. Box 167, both of, Freedom, Wyo. 83120

[21] Appl. No.: 345,943

[22] Filed: Nov. 28, 1994

[51] Int. Cl.⁶ .............................. B65B 9/10; B65B 43/26
[52] U.S. Cl. .................................. 53/567; 53/576
[58] Field of Search .............................. 53/556, 567, 576, 53/218, 228, 459, 469, 384.1, 570, 585

[56] References Cited

U.S. PATENT DOCUMENTS

| | | | |
|---|---|---|---|
| 5,220,772 | 6/1993 | Koskela et al. | 53/576 |
| 5,385,002 | 1/1995 | Cundall | 53/567 X |
| 5,398,487 | 3/1995 | Inman et al. | 53/567 |
| 5,421,144 | 6/1995 | Inman et al. | 53/567 X |

*Primary Examiner*—Horace M. Culver
*Attorney, Agent, or Firm*—M. Reid Russell

[57] ABSTRACT

A hay roll bagging system for bagging a number of hay rolls as have been cut, harvested and dried in a hay field into a plastic sleeve that, is maintained in a stretched state during bagging and then tighten around each hay roll, which sleeve is tied at its ends forming a container. The system is preferably mounted onto a wheeled trailer to be moved into the hay field and includes a cradle structure to receive each hay roll, in turn, and includes a ram for urging a hay roll end off of the craddle and through a collapsing ring. The collapsing ring of the invention is mounted to the trailer across a craddle rear end and is formed to have, in an erected state, a greater diameter than that of a hay roll. The ring receives a folded plastic sleeve therearound when the ring is in a collapsed state. The collapsing ring includes an arcuate bottom section that is fixed to extend upwardly from the trailer frame, across the craddle, that hinge connects, across its ends, to respectively, ends of a pair of arcuate pivot sections, that, in turn, are hinge connected across their opposite upper ends to opposite ends of a folding section, completing the ring. A single double acting piston arrangement is mounted to urge the folding section radially into the collapsing ring and to pull it out therefrom, providing for a collapse of the collapsing ring to received the folded plastic sleeve positioned therearound and for pulling that folding section radially erecting the collapsing ring, and stretching the folded plastic sleeve thereon.

13 Claims, 3 Drawing Sheets

HAY ROLL BAGGING SYSTEM

BACKGROUND OF THE INVENTION

1. Field of the Invention

This invention relates to apparatus and methods for tightly fitting hay rolls end to end in a plastic sleeve and closing the sleeve ends to seal the hay rolls maintained therein until needed.

2. Prior Art

The present invention is an improved system for mounting and stretching a folded plastic sleeve onto a ring wherethrough individual hay rolls are passed off from a hay roll hopper or cradle under the urgings of a ram. The sleeve is tied at one end that receives a first hay roll, and is unfolded off the ring as a first and subsequent hay rolls travel therethrough. Prior systems, to provide a ring arrangement capable of expanding to stretch a plastic sleeve folded thereover, have involved a plurality of overlapping sections that are each arranged to be moved by a hydraulically operated piston to slide over one another for expanding or contracting the ring circumference across the ring middle to top portion. Such arrangements require a separate hydraulic or air operated piston for each leaf, with the operation or which pistons required to be coordinated to provide a required closing and restoration of the ring circumference. The present invention provides a dramatic improvement over such moving leaf system as it involves a plastic sleeve mounting ring that requires only a single hydraulic or air operated piston to fold a folding ring section upon itself and pivot adjacent pivot sections inwardly, folding the ring upon itself. The ring pivot sections are connected to a solid ring portion that is secured to a transport vehicle and the ring pivot sections pivot towards one another as the folding section is folded. Moving the ring folding and pivot sections inwardly provides a reduction in ring circumference so as to allow a folded sleeve to be easily fitted thereon that is for bagging the individual hay rolls. Whereafter, by retracting the single piston, the ring folded section is pulled outwardly and the pivot sections are spread apart to erect the ring to its full circumference, stretching the plastic sleeve folded thereon. The stretched plastic sleeve is fed off the ring as hay rolls are urged therethrough. Which plastic sleeve, when fed off the ring, returns to its original shape to fit tightly against the hay roll.

BRIEF SUMMARY OF THE INVENTION

It is a principal object of the present invention in a hay roll bagging system to provide for mounting and maintaining a plastic sleeve stretched around a collapsing ring that, when erected, receives rolls of hay pushed therethrough to pickup and unfold a section of the plastic sleeve off from the ring as it passes therethrough, which plastic sleeve section tightens around the hay roll and, with the sleeve tied at its ends, provides a tight fitting essentially air tight container for a number of hay rolls.

Another object of the present invention is to provide a collapsing ring structure that is easily collapsed inwardly, shortening the ring circumference so as to facilitate fitting a folded plastic sleeve therearound, and can thereafter be easily returned to its original circumference, stretching the folded plastic sleeve.

Another object of the present invention is to provide, as the arrangement for collapsing the collapsing ring inwardly, a pair of pivot sides that are each hinge connected along a lower end to ends of a base or bottom ring section, and are each hinge connected along an upper end to opposite sides of a pair of folding sections that are, in turn, hinge connected to a plate that extends across the ring and is connected to an end of a hydraulic or air driven piston that, when extended, urges the plate radially into the ring, folding the folding sections and pivot sides into the ring to reduce the ring circumference so as to allow for mounting a plastic sleeve folded thereon, whereafter the ring is restored to its full circumference by retracting the piston, stretching the folded plastic sleeve.

Still another object of the present invention is to provide a hay roll bagging system that can be conveniently trailered into a field to receive individual rolls of hay on a platform or craddle formed thereon and provides for moving each hay roll through the collapsing ring by operation of a hydraulic or pneumatically operated piston, the hay roll to pass through the ring to pick up and unfold a section of the plastic sleeve off from the ring that then relaxes into tight fitting engagement around the hay roll, which plastic sleeve is closed at its ends to seal the hay rolls therein to provide a weather seal.

Still another object of the present invention is to provide a hay roll bagging system that is easy and economical to use in a hay field setting for sacking or bagging a number of hay rolls end to end within a plastic sleeve, the plastic sleeve to fit tightly around the hay rolls and with the ends closed, provides a weather barrier to protect the hay from mold and rot until the sleeve is broken at individual hay rolls as are to be used.

In accordance with the above objects, the hay roll bagging system of the invention is preferably for use in the setting of a hay field for end to end sacking of rolls of hay in a plastic sleeve fitted tightly around which rolls of hay. The plastic sleeve is closed at its ends to provide a tight fitting water proof wrap that will protect individual hay rolls until the sleeve is cut open to provide access. The hay roll bagging system is preferably mounted on a trailer that is arranged to be moved, as by a towing vehicle into a hay field wherein a hay crop and been harvested and formed into individual hay rolls. The system includes a fixed platform or cradle formed as a part of the trailer bed, between parallel longitudinal frame members, whereon hay rolls are individually positioned, as by use of a fork lift. An upright frame is arranged across a craddle forward end that is arranged to be movable between and along the frame members by a piston type ram operated thereagainst, sliding the hay roll therefrom and through a collapsing ring. The collapsing ring is collapsible to reduce the ring circumference so as to allow a plastic sleeve, that has been folded upon itself, to be positioned onto that collapsed ring that is then expanded to its full circumference. In which ring expansion the folded plastic sleeve is stretched to a greater circumference than that of the individual hay rolls. A hay roll passing through the ring picks up a section of the sleeve and unfolds it off of the ring. Which plastic sleeve section, after has traveled off of the ring returns to its original shape, squeezing and tightly fitting around each hay roll. Each hay roll, in turn, as it passes through the ring, picks up and unfolds a section of the plastic sleeve off the ring, with a first hay roll to act against a tied off sleeve end. The unfolded plastic sleeve will thereby contain hay rolls arranged end to end therein is closed off at both its front and rear ends. So arranged, and with the plastic sleeve having shrunk to its original shape, the sleeve will fit tightly against the hay rolls contained therein, protecting them from weathering as they remain in the field.

To provide for collapse of the collapsing ring and for its erection, the ring includes a solid curved lower section that is secured between the trailer frame members, extending upwardly therefrom and positioned across the craddle rear end to receive each hay roll, that is passed therethrough. A pair of arcuate or curved ring pivot sides are each connected to an end of the lower section. Each pivot side, in turn, is connected, by a hinge maintained across at an upper end, to a lower end of a pair of arcuate folding sections. Which folding sections are themselves connected across their upper ends to opposite sides of a rectangular plate, completing the ring. The folding sections at their hinge mounted ends, connect to the plate such that, when the plastic is urged radially towards the ring center, folds the folding section sides towards one another. This causes the ring arcuate pivot sides to pivot or collapse into the ring, towards one another, providing for a reduction in the collapsing ring circumference. Which circumference reduction allows the folded plastic sleeve to be easily fitted onto the collapsed ring that is of a width to accommodate which folded plastic sleeve. Thereafter, by pulling the ring folding section outwardly at the rectangular plate, the ring circumference will be restored. This stretches the folded plastic sleeve, increasing its circumference. The plastic sleeve, after it unfolds off of the ring, due to passage of a hay roll therethrough, relaxes to its original shape, squeezing against the hay roll surface.

For providing ring folding section operation, a piston end is secured at a right angle to the rectangular plate. The piston is arranged to extend out from or is drawn into a housing that is mounted to a rigid support that is adjacent to the collapsing ring. Which rigid support is preferably a solid ring with a greater diameter than that of the collapsing ring and, is secured to the body alongside the collapsing ring. The piston is preferably hydraulically or pneumatically operated to extend out or retract into the housing. The piston urges the plastic into or pulls it out of the ring, to move the folding section sides together or to erect them into a ring section.

Other objects and features of the invention will become apparent from the following detailed description, taken in conjunction with the drawings, disclosing what is presently contemplated as being the best mode of the invention.

DESCRIPTION OF THE DRAWINGS

In the drawings that illustrate that which is presently regarded as the best mode for carrying out the invention.

DETAILED DESCRIPTION

Figure 1:
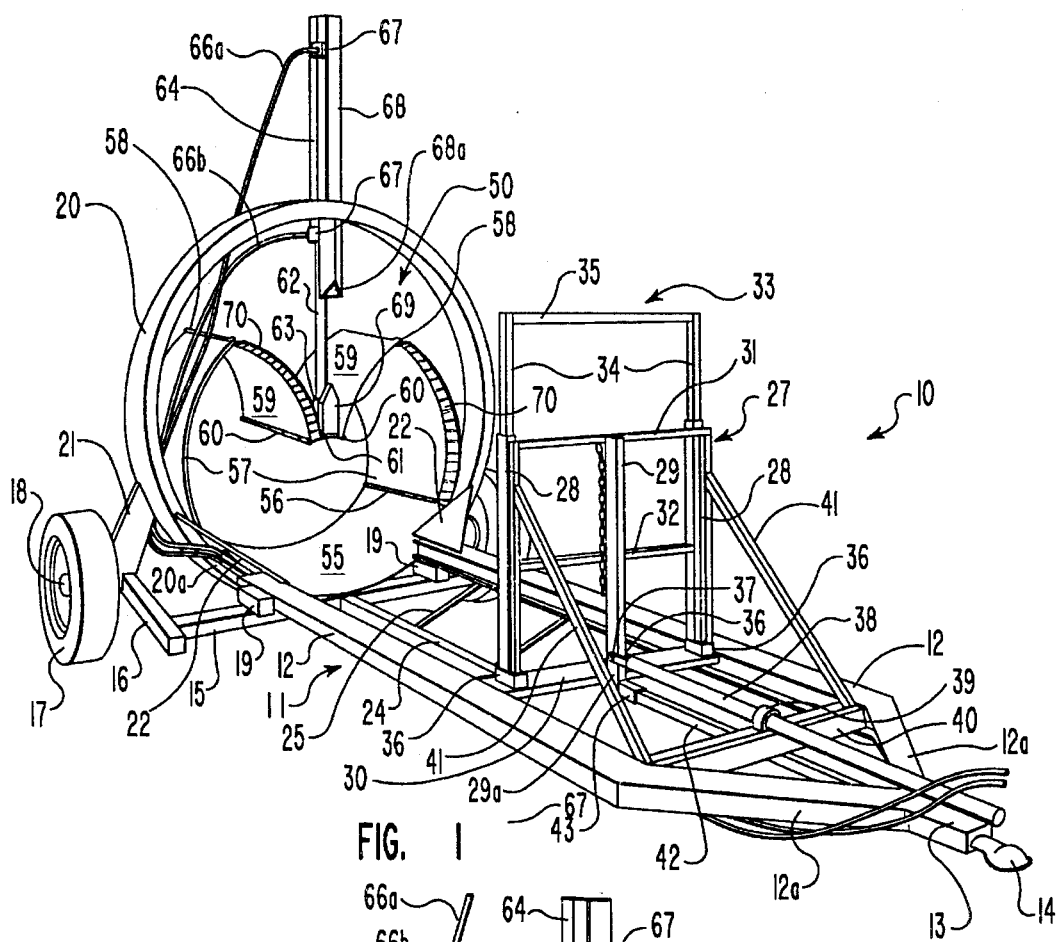
FIG. 1 is a profile perspective view of a hay roll bagging system of the invention shown arranged on a two wheel trailer.

FIG. 1 shows a hay roll bagging or sacking system of the invention, hereinafter referred to as bagging system 10. The bagging system 10 is mounted to a trailer frame 11 that includes parallel side frame members 12, each including a front inwardly sloping frame member 12a that are secured to forward frame member ends and meet at a tongue or straight neck member 13 whereon is mounted a hitch 14 arranged for releasable securing to a trailer ball, or the like. A horizontal or axle member 15 is arranged across the trailer frame 11 rear end, whereto axle supports 16 are connected that are at right angles and are parallel to the frame members 12. Wheels 17 are journaled to rotate on axles 18, which axles are aligned and extend outwardly from axle supports 16. Accordingly, the trailer frame 11 is shown as a single axle trailer though, it should be understood the trailer frame can be arranged with two axles and two pairs of wheels as a tandem trailer, or another trailer frame arrangement can be so used within the scope of this disclosure.

Figure 2:
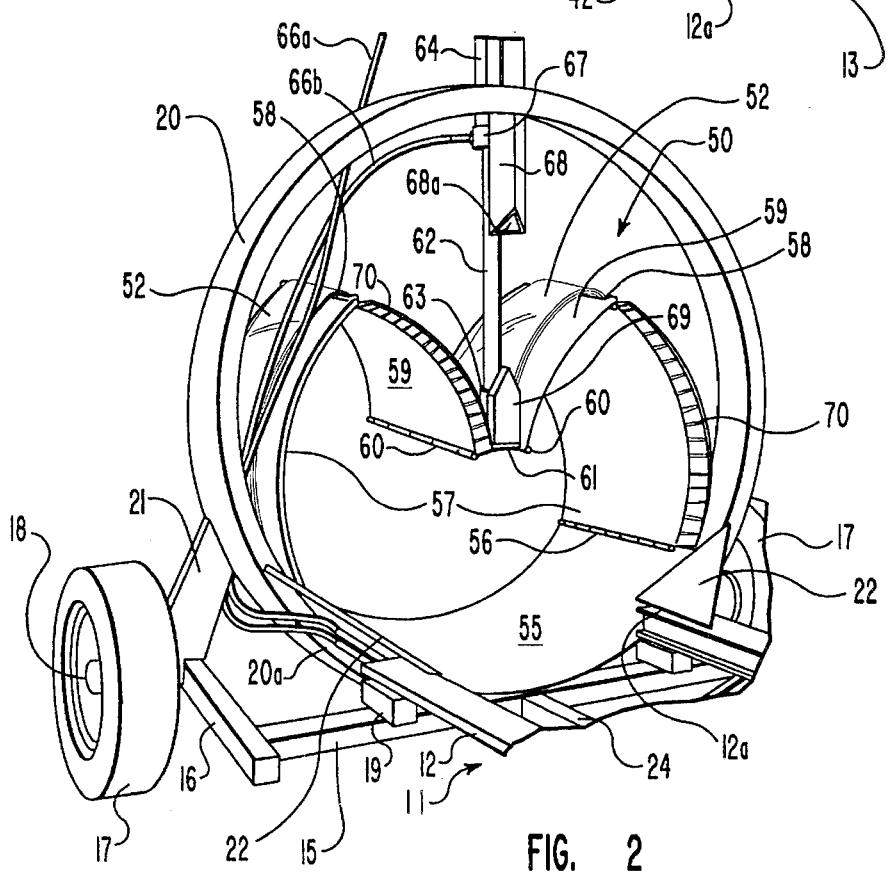
FIG. 2 is an enlarged view of a collapsing ring section of the hay roll bagging system of FIG. 1.
Figure 3:
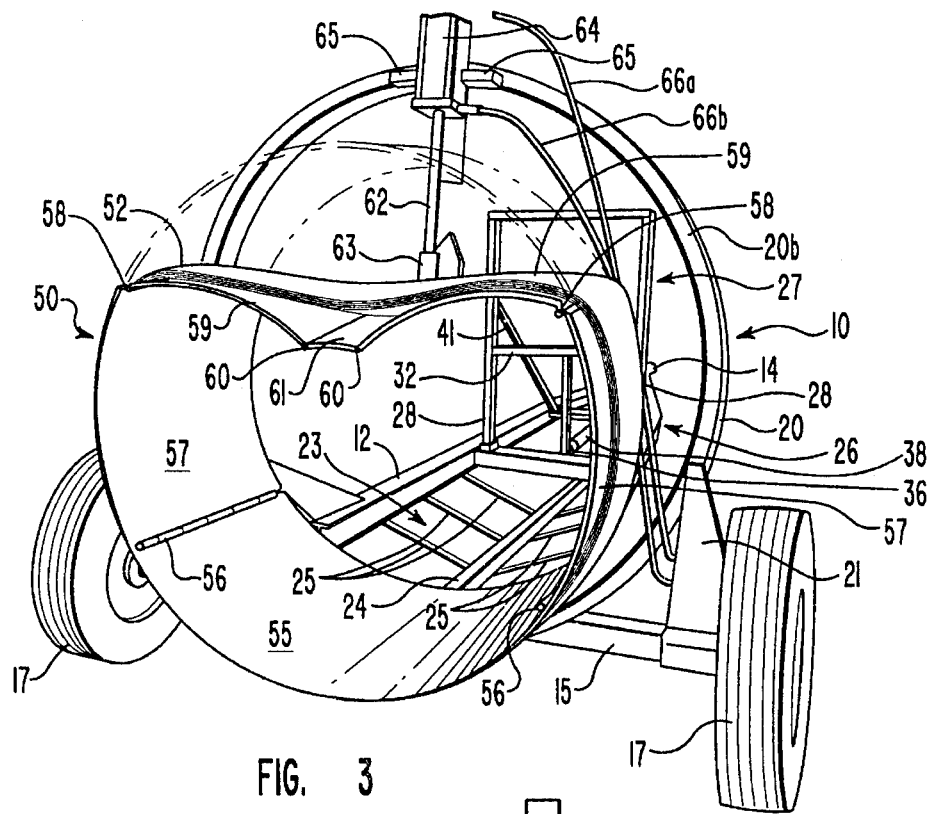
FIG. 3 is a view like that of FIG. 2 only looking into the collapsing ring and showing a forward portion of the hay roll bagging system of FIG. 1.

Shown in FIGS. 1 through 3, the axle member 15 is mounted to the frame members 12 at blocks 19 whereto forward edges 20a a solid ring segment 20 are connected proximate to ends thereof. Which solid ring segment 20 can be a full ring within the scope of this disclosure. For further securing the solid ring segment 20 between blocks 19 to extend upwardly at essentially a right angle from across the trailer frame. Gusset plates 21 are secured between axle supports 16 to a rear face 20b of the solid ring segment 20, whereto the axles 18 are connected. For further securing the solid ring segment 20, mounted to stand upright across the frame members 12, forward gusset plates 22, are provided shown as triangle sections. The gusset plates 22 are each secured along a base to each frame member 12, at rear ends 12a thereof, as shown in FIG. 2, and are connected to the solid ring segment 20 forward face 20a. Which forward gusset plates 22 faces provide slopping surfaces thereacross for guiding a hay roll, as shown in FIG. 4, and as discussed in detail below.

Additional to the trailer frame straight neck member 13 formed by the inwardly slopping frame members 12a, and the rear axle member 15, the trailer frame 11 includes a cradle 23, shown in FIG. 3, craddle 23 is formed between the frame members 12 consisting of a center longitudinal support 24 that extends the length of the trailer frame between the rear axle member 15 and front tongue, and parallel to the frame members 12. Straight ribs 25 are connected at their ends at right angles disposed between the center longitudinal support 24 and frame members 12. The ribs 25 are angled downwardly from the inner surfaces of the frame members to the center longitudinal support 24 forming the cradle 23 as a hay roll receiving platform. The cradle 23 rear end is adjacent to and aligns with a lower edge of a collapsing ring 50. The forward gusset plates 22 slope to provide a surface for guiding a hay roll traveling along the cradle 23 into the collapsing ring 50.

Figure 4:
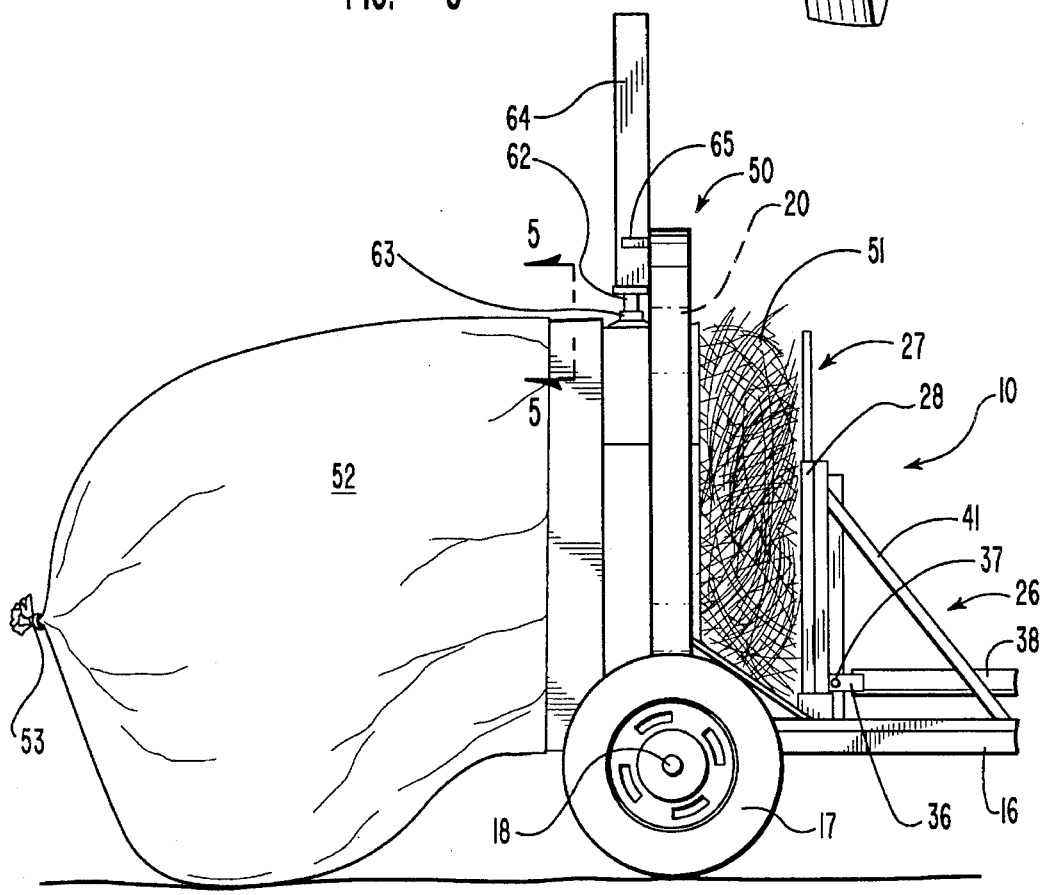
FIG. 4 is a side elevation view of the hay roll bagging system of the invention shown bagging a hay roll into a plastic sleeve.

For moving a hay roll 51, as shown in FIG. 4, from the cradle 23 into and through the collapsing ring 50, a ram 26 is provided, as shown in FIGS. 1, 3 and 4. The ram 26 is arranged to travel from a forward cradle end to the rear cradle end, to move the hay roll therewith. The ram 26, as shown, preferably includes a flat frame 27 that is formed from straight sides and center vertical members 28 and 29, respectively. A horizontal foot plate 30 is secured across the bottom ends of side vertical members 28. A top horizontal member 31 is disposed between the top ends of side vertical members 28, and parallel to foot plate 30. A center horizontal member 32 is disposed between the centers of vertical members 28. The center vertical member 29 is secured to forward edges of the horizontal foot plate 30, top member 31 and center member 32, at approximately the centers thereof, for transferring a force applied against with center vertical member 29 to move the frame 27 along the cradle 23 from its forward end to its rear end, as illustrated in FIGS. 1 and 4. Preferably, as shown best in FIG. 1, the frame 27 is provided with a head or top extension 33 that includes a pair of parallel straight vertical slide members 34 with a top member 35 disposed thereacross. The vertical slide members 34 are arranged to slide within the vertical members 28 that, to accommodate slide members 34, are preferably formed from equal length tubes that are mounted at their foot ends to box feet 36. While not shown, the vertical members 38 each preferably include holes formed at spaced intervals therealong to conform to spaced holes formed at intervals in each of the vertical slide members 34. The respective holes align to receive pins, not shown fitted therethrough supporting the head or top extension 33 extending from the top of frame 27, and in the plane thereof, as shown in FIG. 1.

The frame 27 is arranged to travel between and along the frame members 12. that are preferably I beams, sliding along the I beam flanges, traveling from the trailer frame 11 from front to back. In which travel, a hay roll positioned on cradle 23 will be pushed through collapsing ring 50, as described below.

As shown best in FIG. 1, to provide for frame 27 travel, parallel arms of a clevis 36 are pinned at 37 to the center vertical member 29, providing a pivot coupling therewith. The clevis is arranged as a rear end of a straight rod 38 that is shown fitted through a guide 39. The guide 39 is shown coupled to the center of a sliding cross beam 40 that slides along the flanges of the I beam frame members 12, following the frame 27. The sliding cross beam 40 is connected to frame 27 by angle braces 41 that are disposed on the bias between the frame side vertical support members 28 and the sliding cross beam 40. Which guide is for maintaining the straight rod, to prohibit it from bowing as it moves the frame 27.

A hydraulic, pneumatic or mechanical drive arrangement, not shown, is preferably provided for driving the straight rod 38 to, in turn, move the frame 27 along the frame members 12 towards the collapsing ring 50. The frame 27 thereby pushes a hay roll 51 out of the cradle 23 and through which collapsing ring, as set out below, and with the direction of travel reversed, retracts the frame to the attitude shown in FIGS. 1 and 3. As shown best in FIG. 1, for restraining travel of the frame 27 away from the collapsing ring 50 a rod 42 is secured below the trailer neck 14 and extends to a point adjacent to cradle 23 whereon a head 43 is mounted. With movement of the frame 27 toward the trailer tongue end a lower end 29a of the center vertical member 29 as a limit to further frame 27 forward travel.

The structure of the hay bagging system, as set out above, in a trailer mounted hay roll receiving cradle, ram for moving the hay roll through a solid ring section and a ring arranged for mounting a folded plastic sleeve are essentially like earlier hay bagging or sacking arrangements. The present invention, as an improvement over such earlier systems, provides the unique collapsing ring 50, that is set out and described in detail immediately hereinbelow.

Figure 5:
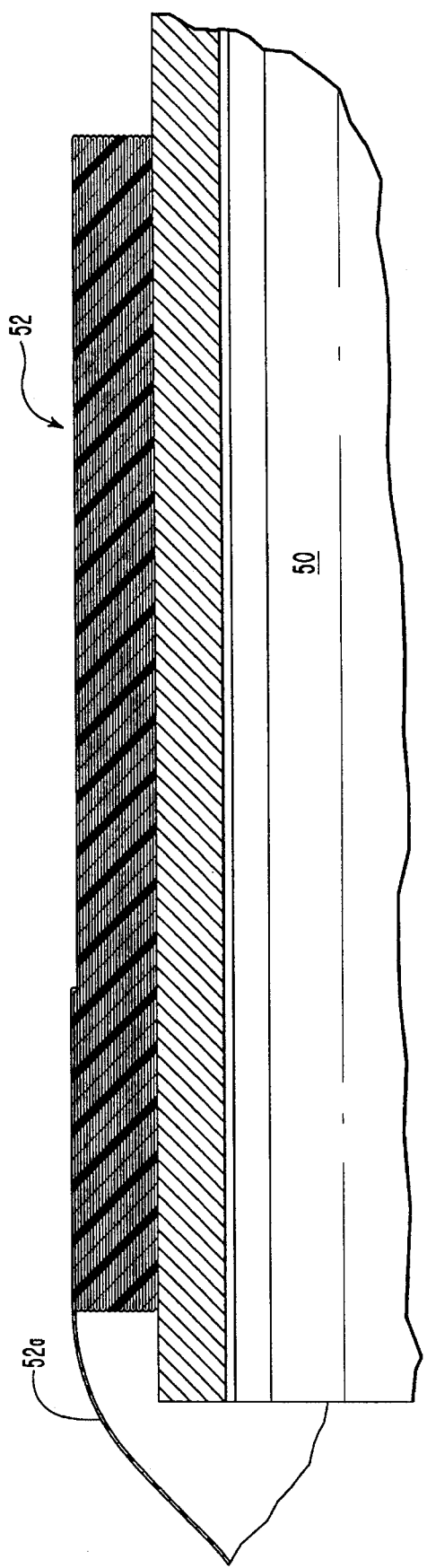
FIG. 5 is a sectional view taken along the line 5—5 of FIG. 4, showing a plastic sleeve folded upon itself and positioned on a section of the collapsing ring that has been erected to its full circumference, stretching the plastic sleeve thereon, and shows a section of the plastic sleeve being unfolded off of the collapsing ring as a hay roll is passed therethrough.

The collapsing ring 50 is shown collapsed in FIGS. 1 and 2, is shown in the process of being erected in FIG. 3, and is shown fully erected in FIG. 4, which FIG. 4 shows a hay roll 51 being urged through the collapsing ring 50 and into a plastic sleeve 52 that is shown also in FIG. 5, and is tied at its end by a tie 53. Collapsing the collapsing ring 50, as shown in FIGS. 1 and 2 is to allow a plastic sleeve 52 that is shown as having been folded upon itself and fitted thereover. Thereafter, by expanding the collapsing ring 50 back to its erected circumference the plastic sleeve 52 is stretched thereon. In its erected state, the collapsing ring 50 circumference is greater than that of hay roll 51 to conveniently fit therethrough, picking up the plastic sleeve end that is tied by tie 53, as shown in FIG. 5. The sleeve 52 is thereby pulled so as to unfold a section 52a thereof and following sections of the folded plastic sleeve, bagging the hay roll 51 therein. In which bagging, as the plastic sleeve section 52a is pulled off the stack 52, it relaxes around the hay roll 51, as shown in FIG. 4, providing a tight fit therearound.

In practice, a number of hay rolls are passed, as described above, through the collapsing ring 50 each pulling additional plastic sleeve sections 52a therefrom until the plastic sleeve end is reached that is then tied off. So arranged, the plastic sleeve 52 will contain a number of hay rolls maintained end to end therein, with the sleeve fitting tightly therearound as a moisture barrier until the sleeve is broken into to use the hay at that break.

The collapsing ring 50, as set out above, receives and stretches the folded plastic sleeve 52 thereon and dispenses sections therefrom as hay rolls 51 are passed therethrough. The collapsing ring 50 includes a unique arrangement for easily and reliably collapsing it to allow for positioning of the folded plastic sleeve 52 thereover and for then erecting the ring to its full circumference, stretching the plastic sleeve thereon. Shown in FIGS. 1 through 3, the collapsing ring 50 includes a curved base or bottom section 55 that is secured across the trailer frame 11 rear end. Connection is made between the bottom ends of solid ring section 20, or across the bottom portion thereof if the solid ring section is formed as a continuous ring, such that the collapsing ring bottom section is mounted alongside or within the solid ring section 20. Which collapsing ring bottom section 55 and the connected ring pivot and folding sections connected thereto, as set out below, are of a width to conveniently accommodate the folded plastic sleeve 52 fitted thereon, as illustrated in FIG. 5. A collapsing ring 50 having a width of 30 to 40 inches and an erected diameter of 56 to 68 inches can be used successfully as the collapsing ring of this invention.

Collapsing ring pivot sides 57 connect at hinges 56 across bottom ends thereof to parallel ends of bottom section 55 to pivot inwardly as shown best in FIGS. 1 and 2, and to pivot outwardly as shown in FIG. 3 to a fully erected ring as shown in FIG. 4. To control which pivot sides 57 inward and outward travel, the pivot sides top ends are each connected through hinges 58 secured thereacross to a lower end of a pair of folding sections 59. The folding sections 59, in turn, are connected to hinges 60 secured across their top ends to opposite parallel sides of a rectangular plate 61. Which bottom section 55, pivot sides 57, folding sections 59 and plate 61 are all curved appropriately, as needed, and all have the same width to form a collapsing ring 50 that has essentially a uniform round shape and width, and the hinges 56, 58 and 60 are all preferably piano type hinges.

Moving of the plate 61 towards the collapsing ring 50 center folds the folding sections 59 towards one another and pivots the pivot sides 57 towards one another, shortening the ring circumference, as shown in FIGS. 1 and 2. This allows folded plastic sleeve 52 to be fitted onto the collapsed ring, as shown in FIGS. 2 and 3. For moving plate 61 into the ring 50, radially towards the ring center, or pulling it radially away from the center, a straight piston 62 connects to a plate 61 top surface through a mounting collar 63. The piston 62 is arranged to extend out of and be retracted back into a housing 64 that is secured to the side of the solid ring section 20, and includes hoses 66a and 66b connected through fittings 67 into top and bottom housing ends. The hoses are for transferring hydraulic fluid or air under pressure to act on a piston pressure end. The piston 62 is thereby urged out of the housing, as shown in FIGS. 1 and 2, or retracted back into the housing 64, as shown in FIGS. 3 and 4.

Solid ring section 20 mounts the piston housing 64 thereto, between brackets 65, to provide a rigid anchor against which piston 62 is operated to collapse or erect the collapsing ring 50. When erecting the collapsing ring 50, whereas a folded plastic sleeve 52 has been fitted, there will exist a resistance to ring erection that may not be balanced across the ring width. As the piston 62 acts at only its connection point to plate 61, that unbalance resistance could create a plate 61 canting or tilting to bend it away from a right angle to the piston 62, potentially damaging the system. To preclude such plate canting or tilting, the piston housing preferably includes a guide tube 68 secured longitudinally to and extends beyond the housing lower end and is open across a lower tube end 68a. The guide tube is to receive a pin 69 that is secured to extend at a right angle upwardly from the plate top surface and is aligned to travel into the tube end 68a to where the pin 69 bottom end contacts the lower tube end 68a. The contact of the pin within the guide tube inner surface maintains piston positioning as the piston 62 is pulled into housing 64, erecting the collapsing ring 50. Two points of contact between the plate 61 and piston 62 and guide tube 68 and pin 69 are thereby provided to prohibit the plate 61 from canting or tilting from the piston 62 end as the collapsing ring 50 is erected to the attitude shown in FIG. 4, fully stretching the plastic sleeve 52 fitted thereon.

As set out above, the frame members 12, cradle 23 and connected forward gusset plates 22 are arranged to guide a hay roll 51 into the collapsing ring 50. Additionally, for guiding such hay roll, the forward edges of the respective pivot sides 57 and folding sections 59 are preferably bent outwardly at 70, to contact and direct a hay roll outer edge into and through the collapsing ring 50, as shown in FIG. 4.

Although a preferred form of our invention in a hay roll bagging system and its use for fitting and sealing hay rolls end to end into a tight fitting plastic sleeve that is closed on its ends into a weather tight container has been shown and described herein, it should be understood that the present disclosure is made by way of example only and that variations are possible without departing from the subject matter coming within the scope of the following claims and a reasonable equivalency thereof, which subject matter we regard as our invention.

We claim:

1. A hay roll bagging system comprising, transport means; a cradle means maintained on said transport means and arranged for receiving a hay roll positioned thereon where longitudinal axes of said cradle means and hay roll align; ram means disposed to a hay roll end to move said hay roll along and off a rear end of said cradle means; a collapsing ring that has a greater diameter, when erected, than said hay roll and includes a rigid arcuate bottom section having parallel sides and ends and is maintained across a cradle means rear end, opposite ends of which said bottom section mount hinge means therealong that connect to lower ends of each of a pair of arcuate pivot sides, and folding section means are disposed between upper ends of said arcuate pivot sides, completing said collapsing ring, which said folding section means is arranged to be folded upon itself, pivoting said arcuate pivot sides toward one another, to shorten said collapsing ring circumference so as to accommodate a plastic sleeve fitted thereon, and said folding section means can be unfolded to pivot said arcuate pivot sides outwardly and restore said collapsing ring to its original circumference stretching said plastic sleeve thereon; and means for folding and unfolding said folding section means upon itself.

2. A hay roll bagging system as recited in claim 1, wherein the arcuate pivot sides have parallel sides and ends that have the same width as the bottom section, with top ends of each said arcuate pivot sides connected by a hinge means to one end of opposite ends of the folding section means; and the hinge means connecting the bottom and top ends of the arcuate pivot sides to, respectively, the arcuate bottom section and folding section means are piano type hinges.

3. A hay roll bagging system as recited in claim 2, wherein the folding section means includes a center rectangular plate that connects to the means for folding and unfolding the folding section means upon itself, and said rectangular plate includes parallel sides that each connect, by a hinge means, to a side of each of a pair of rectangular shaped arcuate segments whose opposite parallel sides are each connected by a hinge means to top ends of the arcuate pivot sides; and said hinge means connecting said rectangular plate sides to each of said arcuate segments and each of said arcuate segments to said arcuate pivot sides are piano type hinges.

4. A hay roll bagging system as recited in claim 3, wherein the means for folding and unfolding the folding section means upon itself is a straight piston connected at approximately a right angle to extend outwardly from a top surface of the rectangular plate, which said piston is fitted to slide in and out of a housing that connects to a transfer means to pass a flow of a fluid under pressure thereto to extend said piston out of said housing and to retract said piston into said housing; and anchor means for connecting to said housing for maintaining said housing stationary relative to said rectangular plate.

5. A hay roll bagging system as recited in claim 4, further including guide means mounted to the housing and to extend upwardly from the rectangular plate that consists of a cylinder for mounting to said housing and having a passage therethrough that is parallel to the piston, and a pin means that extends outwardly from said rectangular plate and parallel to said piston, said pin means, as said piston is retracted into said housing to fit into an open end of said sleeve and travel therein to where said sleeve open end engages a base of said pin means when said piston is fully retracted into said housing and the collapsing ring has returned to its full circumference.

6. A hay roll bagging system as recited in claim 3, wherein the transfer means are hoses connected into, respectively, the housing top and bottom portions to pass fluid under pressure therethrough and to vent fluid therefrom for extending and retracting the piston; and the anchor means is a solid ring means mounted to the transport means to be outside of the collapsing ring having a greater diameter than the diameter of said collapsing ring when said collapsing ring is erected, and said housing is mounted to said solid ring means to where the piston when extended from said housing will move the connected rectangular plate along a radial towards said collapsing ring center, and said piston, when retracted into said housing will pull said rectangular plate radially to erect said collapsing ring into a full circle.

7. A hay roll bagging system as recited in claim 3, further including edges of the arcuate pivot sides and the arcuate shaped segments are juxtapositioned to the rear end of the cradle means and are bent to angle outwardly from the inner surface of said arcuate pivot sides and arcuate segments.

8. A hay roll bagging system as recited in claim 3, wherein the collapsing ring rigid arcuate bottom section, arcuate pivot sides and folding section means have the same width, and which width is sufficient to accommodate a plastic sleeve folded upon itself and fitted thereon when said collapsing ring is collapsed, said folded plastic sleeve to be stretched therearound when said collapsing ring is restored to its original circumference.

9. A hay roll bagging system as recited in claim 1, wherein the transport means is a trailer mounted on wheels that is arranged to be pulled by a motor vehicle and includes parallel frame members as sides of said trailer, each frame member having at least one inwardly facing flange; and the ram means is a flat rectangular frame section, and is connected, across a lower end, to a straight bar means that is fitted between said parallel frame members, with ends of said straight bar means arranged onto to slide along said parallel frame members flanges, whereby said frame section engages an end of the hay roll to push it from the cradle means and through the collapsing ring; and means for moving said frame section along said parallel frame members flanges.

10. A hay roll bagging system as recited in claim 9, wherein the parallel frame members are I beams with the straight bar means ends fitted between to slide along parallel inwardly pointing I beam flanges; and the means for moving the frame section is a straight rod that is connected on a rear end onto approximately the horizontal center of the frame section, and includes a means for moving said straight rod to move said frame section along said frame members.

11. A hay roll bagging system as recited in claim 10, further including a guide means for guiding travel of the straight rod; a frame section top extension for travel away from a frame section top edge with means for maintaining said top extension positioned out from said frame section; and stop means for blocking travel of said frame section away from the collapsing ring.

12. A hay roll bagging system as recited in claim 9, wherein the cradle means is a straight center longitudinal member secured to a trailer frame, below and parallel to the frame members and including a plurality of straight spaced lateral members disposed between said center longitudinal member and to a bottom surface of each said frame member.

13. A hay roll bagging system as recited in claim 12, further including a pair of guide plates each secured to a frame member rear end top surface, said guide plates each having a flat face that forms approximately a right angle to a plane across the collapsing ring, for guiding travel of a hay roll off from said frame members and through said collapsing ring.

* * * * *